(12) United States Patent
Mahmood et al.

(10) Patent No.: US 11,258,639 B2
(45) Date of Patent: Feb. 22, 2022

(54) NON-LINEAR EQUALIZER IN COMMUNICATION RECEIVER DEVICES

(71) Applicant: NanoSemi, Inc., Waltham, MA (US)

(72) Inventors: Zohaib Mahmood, Westwood, MA (US); Alexandre Megretski, Acton, MA (US); Helen H. Kim, Sudbury, MA (US)

(73) Assignee: NanoSemi, Inc., Waltham, MA (US)

( * ) Notice: Subject to any disclaimer, the term of this patent is extended or adjusted under 35 U.S.C. 154(b) by 0 days.

(21) Appl. No.: 16/763,407

(22) PCT Filed: Nov. 9, 2018

(86) PCT No.: PCT/US2018/060032
§ 371 (c)(1),
(2) Date: May 12, 2020

(87) PCT Pub. No.: WO2019/094720
PCT Pub. Date: May 16, 2019

(65) Prior Publication Data
US 2021/0075649 A1 Mar. 11, 2021

Related U.S. Application Data

(60) Provisional application No. 62/584,963, filed on Nov. 13, 2017.

(51) Int. Cl.
*H04L 25/03* (2006.01)
*H04L 25/02* (2006.01)

(52) U.S. Cl.
CPC .... *H04L 25/03057* (2013.01); *H04L 25/0202* (2013.01); *H04L 25/03114* (2013.01); *H04L 25/03343* (2013.01)

(58) Field of Classification Search
CPC ......... H04L 25/03057; H04L 25/03343; H04L 25/03114; H04L 25/0202
See application file for complete search history.

(56) References Cited

U.S. PATENT DOCUMENTS

| 6,052,412 | A | 4/2000 | Ruether et al. |
| 6,876,696 | B1 * | 4/2005 | Goodson ............... H04L 5/1438 370/497 |

(Continued)

FOREIGN PATENT DOCUMENTS

| WO | 99/53658 A1 | 10/1999 |
| WO | 01/97475 A1 | 12/2001 |
| WO | 2007/139119 A1 | 12/2007 |

OTHER PUBLICATIONS

International Search Report dated Jan. 18, 2019 in International Application No. PCT/US2018/060032.

*Primary Examiner* — Vineeta S Panwalkar
(74) *Attorney, Agent, or Firm* — Occhiuti & Rohlicek LLP

(57) ABSTRACT

Disclosed are methods, systems, devices, apparatus, media, design structures, and other implementations, including a method is that includes receiving, at a receiver device, a signal transmitted from a remote wireless device, with the signal including a training sequence, and updating, based on the training sequence, one or more adjustable characteristics for a non-linear equalizer of the receiver device, with the one or more adjustable characteristics controlling signal non-linear compensation processing to correct non-linear distortions affecting communication signals transmitted from the remote wireless device. In some embodiments, the method may further include updating, based on the training sequence, additional one or more adjustable characteristics for a linear equalizer of the receiver device, with the additional one or more adjustable characteristics controlling (Continued)

signal linear compensation processing to correct linear distortions affecting the communication signals.

48 Claims, 5 Drawing Sheets

(56) References Cited

U.S. PATENT DOCUMENTS

| | | |
|---|---|---|
| 7,599,431 B1 | 10/2009 | Anderson et al. |
| 8,386,892 B1* | 2/2013 | Jamieson .......... H03M 13/6527 |
| | | 714/780 |
| 2003/0152170 A1* | 8/2003 | Yousef ................ H04L 25/0236 |
| | | 375/340 |
| 2003/0179830 A1* | 9/2003 | Eidson ................ H04B 1/0475 |
| | | 375/296 |
| 2007/0091992 A1 | 4/2007 | Dowling |
| 2007/0230557 A1 | 10/2007 | Balasubramonian et al. |
| 2014/0177695 A1 | 6/2014 | Cha et al. |
| 2016/0095110 A1 | 3/2016 | Li et al. |
| 2017/0170992 A1* | 6/2017 | Hidaka ............. H04L 25/03006 |

* cited by examiner

NON-LINEAR EQUALIZER IN COMMUNICATION RECEIVER DEVICES

CROSS REFERENCE TO RELATED APPLICATIONS

This application is the national phase under 35 USC 371 of international application no. PCT/US2018/060032, filed Nov. 9, 2018, which claims the benefit of the U.S. Provisional Application No. 62/584,963, entitled "Non-Linear Equalizer in Communication Receiver Devices" and filed Nov. 13, 2017, the content of which is incorporated herein by reference in its entirety.

BACKGROUND

The present disclosure relates to equalizers employed in wireless devices.

When a signal is transmitted over a wireless communication system, it is subject to linear as well as non-linear transformations or distortions along transmission path, including in the transmit circuitry (e.g., modulator, power amplifier, transmit antenna and interconnecting cabling), along the over-the-air channel, which may introduce varying frequency-dependent magnitude and phase variation, and in the receive circuitry (e.g., receive antenna, low noise amplifier). Communication systems attempt to "equalize" the received signal (understood broadly as compensating for or, essentially inverting, these effects to restore the original transmitted signal) to improve the ability to extract information from the received signal. Various wireless standards characterize the end-to-end effect as a linear channel (i.e., a gain and phase as a function of frequency), and invert this linear effect in a linear equalizer. In some wireless standards that make use of frame-based communication, the standards provide for the periodic inclusion of a training sequence (or pilot sequence) during data transmission, for example, as a preamble to each frame. Such a training sequence is known to the receiver and can be used to train the equalizer (e.g., update coefficients of a linear filter).

SUMMARY

In a general aspect, a receiver performs a non-linear equalization of a received signal, thereby providing an improved recovery of the transmitted signal by compensating for non-linear effects introduced in the end-to-end channel, for example, at the transmitter (e.g., in the transmitter power amplifier) or potentially introduced at other points in the end-to-end channel. The approach is based on receiving of a known signal, such as the training sequence of a transmitted frame. An advantage may include the ability to compensate for transmitter non-linearities without requiring the transmitter to implement potentially complex schemes such a digital pre-distortion to mitigate its non-linear effects. Another advantage is that a received training sequence may be used to also train (e.g., determine adjustable compensation parameters) of a linear equalizer that may be used in conjunction with the non-linear equalizer of a receiving device.

In some variations, a method is provided that includes receiving, at a receiver device, a signal transmitted from a remote wireless device, with the signal including a training sequence, and updating, based on the training sequence, one or more adjustable characteristics for a non-linear equalizer of the receiver device, with the one or more adjustable characteristics controlling signal non-linear compensation processing to correct non-linear distortions affecting communication signals transmitted from the remote wireless device.

Embodiments of the method may include at least some of the features described in the present disclosure, including one or more of the following features.

The method may further include updating, based on the training sequence, additional one or more adjustable characteristics for a linear equalizer of the receiver device, with the additional one or more adjustable characteristics controlling signal linear compensation processing to correct linear distortions affecting the communication signals.

Updating the additional one or more adjustable characteristics for the linear equalizer may include deriving channel estimation parameters using the training sequence, with the channel estimation parameters comprising gain and phase estimates at one or more frequencies, and applying linear distortion compensation to subsequent signals received at the receiver device according to the derived channel estimation parameters.

Updating the one or more adjustable characteristics may include jointly updating, based on the training sequence, the one or more adjustable characteristics for the non-linear equalizer and for a linear equalizer of the receiver device.

Receiving the signal transmitted from the remote wireless device may include receiving a WiFi packet comprising known training signals.

The non-linear equalizer may be located downstream from a linear equalizer of the receiver device.

The training sequence may be a preamble of a data frame, with the data frame further comprising a data body portion. The method may further include processing the data body portion of the data frame according to the updated one or more adjustable characteristics to correct non-linear distortions affecting the data body portion.

Updating the one or more adjustable characteristics for the non-linear equalizer of the receiver device may include updating digital filter parameters to compensate for transmit chain non-linear distortions caused by a transmit chain of the remote wireless device through an optimization process that minimizes an error between pre-determined samples of the training sequence and observed samples at an output of the non-linear equalizer.

Updating the one or more adjustable characteristics for the non-linear equalizer of the receiver device may include updating digital filter parameters to compensate for transmit chain non-linear distortions caused by a transmit chain of the remote wireless device through an optimization process that minimizes an error between pre-determined samples of the training sequence processed by a linear equalizer located upstream from the non-linear equalizer, and observed samples at an output of the non-linear equalizer.

Updating, based on the training sequence, one or more adjustable characteristics for the non-linear equalizer of the receiver device may include selecting from a plurality of sets of pre-determined adjustable characteristics, based on one or more system characteristics representative of operating points of at least one of the remote wireless device or the receiver device, two or more sets of pre-determined adjustable characteristics, and determining an interpolated set of adjustable characteristics from the selected two or more sets of pre-determined adjustable characteristics.

The training sequence may include period pilot signals with known pilot signal characteristics.

In some variations, a receiver device is provided that includes a communication module to receive a signal transmitted from a remote wireless device, with the signal including a training sequence, and a non-linear equalizer configured to perform non-linear signal compensation to correct non-linear distortions affecting communication signals transmitted from the remote wireless device. The receiver device further includes a controller configured to update, based on the training sequence, one or more adjustable characteristics for the non-linear equalizer of the receiver device, with the one or more adjustable characteristics controlling signal non-linear compensation processing performed by the non-linear equalizer.

Embodiments of the receiver device may include at least some of the features described in the present disclosure, including at least some of the features described above in relation to the method, as well as one or more of the following features.

The receiver device may further include a linear equalizer, located upstream from the non-linear equalizer, and configured to perform linear signal compensation to correct linear distortions affecting the communication signals transmitted from the remote wireless device. The controller may further be configured to update, based on the training sequence, additional one or more adjustable characteristics for the linear equalizer, the additional one or more adjustable characteristics controlling signal linear compensation processing performed by the linear equalizer.

The controller configured to update the additional one or more adjustable characteristics for the linear equalizer may be configured to derive channel estimation parameters using the training sequence, with the channel estimation parameters comprising gain and phase estimates at one or more frequencies, and to apply linear distortion compensation to subsequent signals received at the receiver device according to the derived channel estimation parameters.

The controller configured to update the one or more adjustable characteristics may be configured to jointly update, based on the training sequence, the one or more adjustable characteristics for the non-linear equalizer and additional one or more adjustable characteristics for a linear equalizer of the receiver device.

The communication module configured to receive the signal transmitted from the remote wireless device may be configured to receive a WiFi packet comprising known training signals.

The non-linear equalizer may be located downstream from a linear equalizer of the receiver device.

The training sequence may be a preamble of a data frame, with the data frame further comprising a data body portion. The controller may further be configured to process the data body portion of the data frame according to the updated one or more adjustable characteristics to correct non-linear distortions affecting the data body portion.

The controller configured to update the one or more adjustable characteristics for the non-linear equalizer of the receiver device may be configured to update digital filter parameters to compensate for transmit chain non-linear distortions caused by a transmit chain of the remote wireless device through an optimization process that minimizes an error between pre-determined samples of the training sequence and observed samples at an output of the non-linear equalizer.

The controller configured to update the one or more adjustable characteristics for the non-linear equalizer of the receiver device may be configured to update digital filter parameters to compensate for transmit chain non-linear distortions caused by a transmit chain of the remote wireless device through an optimization process that minimizes an error between pre-determined samples of the training sequence processed by a linear equalizer located upstream from the non-linear equalizer, and observed samples at an output of the non-linear equalizer.

The controller configured to update, based on the training sequence, the one or more adjustable characteristics for the non-linear equalizer of the receiver device may be configured to select from a plurality of sets of pre-determined adjustable characteristics, based on one or more system characteristics representative of operating points of at least one of the remote wireless device or the receiver device, two or more sets of pre-determined adjustable characteristics, and to determine an interpolated set of adjustable characteristics from the selected two or more sets of pre-determined adjustable characteristics.

The training sequence may include period pilot signals with known pilot signal characteristics.

In some variations, another receiver device is provided that is configured to perform one or more of the method steps provided above.

In some variations, a design structure is provided that is encoded on a non-transitory machine-readable medium, with the design structure including elements that, when processed in a computer-aided design system, generate a machine-executable representation of one or more of the modules of the receiver device described above.

In some variations, an integrated circuit definition dataset that, when processed in an integrated circuit manufacturing system, configures the integrated circuit manufacturing system to manufacture one or more of the modules of the receiver devices described above.

In some variations, a non-transitory computer readable media is provided that is programmed with a set of computer instructions executable on a processor that, when executed, cause the operations comprising the various method steps described above.

Embodiments of the other receiver device, the design structure, the integrated circuit definition dataset, and the computer-readable media may include at least some of the features described in the present disclosure, including at least some of the features described above in relation to the method and/or the first receiver device.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

A training sequence known to a receiver may be included within a wireless signal (such as in the preamble of a WiFi packet or frame) is used to train an equalizer at the receiver. Conventionally, the training sequence is used to model linear channel properties, and to thus correct linear distortions that the signal may have undergone as it travels to a receiver device. The implementations described herein use such training sequences to train an equalizer, which addresses both linear and non-linear effects on the end-to-end channel, provided in the receiver device. In some implementations, an overall equalizer is implemented as a tandem arrangement of a linear equalizer followed by a non-linear equalizer. In addition to modeling linear channel properties of the transmit and receive circuitry and the over-the-air channel with a linear equalizer, the nonlinear equalizer can help correct nonlinear channel behavior. For example, if the transmitting power amplifier is nonlinear, then using only linear equalization may be insufficient to accurately recover the transmitted signal. In such a case, using both linear and nonlinear receiver equalization processing can lead to improved performance.

Thus, disclosed herein are methods, systems, devices, media, and other implementations, for receiver compensation processing that includes linear and non-linear equalization processing (to compensate for linear and non-linear signal distortions). The implementations include a method comprising receiving, at a receiver device (e.g., a network node or a mobile phone), a signal transmitted from a remote wireless device (e.g., a WLAN access point, a base station, a personal wireless device, etc.), with the signal including a training sequence (e.g., a training sequence such as training data provided within training fields of a WiFi 802.11ac packet). The method further includes updating, based on the training sequence, one or more adjustable characteristics for a non-linear equalizer of the receiver device, with the one or more adjustable characteristics controlling signal non-linear compensation processing to correct non-linear distortions affecting communication signals transmitted from the remote wireless device. In some embodiments, the method may further include updating, based on the training sequence, additional one or more adjustable characteristics for a linear equalizer (e.g., located upstream from non-linear equalizer) of the receiver device, with the additional one or more adjustable characteristics controlling signal linear compensation processing to correct linear distortions affecting the communication signals. In some embodiments, updating the one or more adjustable characteristics may include jointly updating, based on the training sequence, the one or more adjustable characteristics for the non-linear equalizer and for a linear equalizer of the receiver device.

Figure 1:
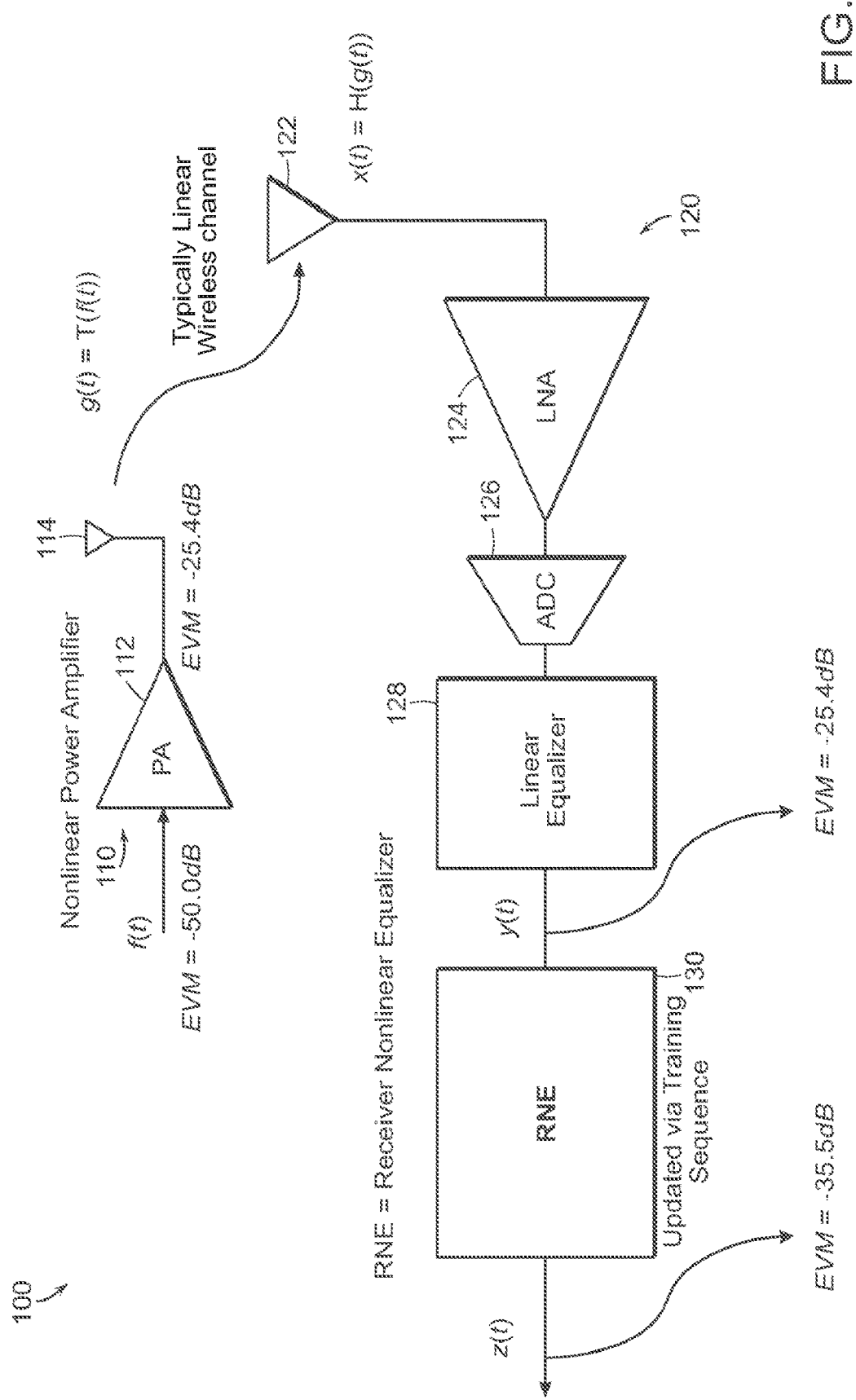
FIG. 1 is a schematic diagram of a system that includes a transmitting device and a receiver device configured to perform linear and non-linear equalization.

With reference to FIG. 1, a schematic diagram of a system 100 includes a transmitting device 110 and a receiver device 120 configured to perform linear and non-linear equalization (to compensate for signal distortions). The transmitting device 110, which may be a network node (e.g., a WLAN access point, a WWAN base station) or a personal device (personal mobile device), may be configured for signal transmitting and signal receiving functionality, and may include a power amplifier 112 with non-linear behavior that may be manifested as harmonic and/or intermodulation distortion of the input signal. Coupled to the power amplifier 112 is an antenna element 114 to wirelessly transmit the amplified signal. The transmitting device may include additional modules, not shown, interposed between the PA 112 and the antenna element 114, as well as additional modules/units, located upstream of the PA 112, such as a digital-to-analog converter (DAC), an analog lowpass filter, a modulator (e.g., multiplication by a local oscillator) of the output of the lowpass filter, etc. Each of these modules/units may also introduce distortions (e.g., non-linear distortions) to the signal transmitted by the transmitting device. The PA 112 and the various modules/unit coupled to it are sometimes referred to as the "transmit chain" of the transmitting device 110. It is to be noted that in some situations the transmit chain may be coupled to a digital predistorter that processes input signals provided to the transmit chain in order to mitigate at least some of the non-linear distortion of the transmitting device. However, a remote receiving device such as the device 120 depicted in FIG. 1 may not know whether such distortion mitigation has been performed, and therefore, for at least some of the implementations described herein, it is assumed that at least some non-linear distortion attributable to the transmitting device is present in a signal received from the remote transmitting device. In some embodiments, linearization and/or non-linearization compensation operations may take into account linear and non-linear distortions and characteristics of the receiver device (analog receiver device), as more particularly described, for example, in U.S. Pat. No. 9,564,876, entitled "Digital compensation for a non-linear analog receiver," the content of which is hereby incorporated by reference in its entirety.

The signal transmitted by the transmitting device will travel wirelessly to one or more devices, and will be subjected to channel distortion (e.g., distortion which can be represented relatively accurately using a linear model) before reaching a receiver device such as the device 120.

As further depicted in FIG. 1, the receiver device includes a receiving element (antenna) 122, coupled to a low-noise amplifier (LNA) 124, and to an analog-to-digital converter (ADC) 126. The output of the ADC 126 is coupled to the input of a linear equalizer 128, and the output of the linear equalizer 128 is coupled to a nonlinear equalizer 130. In some embodiments, the nonlinear equalizer may be situated at a position preceding the linear equalizer (as seen from antenna element 122). In some examples, the receiver device may not include a linear equalizer. As noted, the linear equalizer is configured to correct linear distortions caused, for example, by channel conditions of the communication channel through which signals from the transmitting device 110 travel, while the non-linear equalizer 130 is configured to correct non-linear distortions, for example, introduced by the power amplifier 112. The linear equalizer 128 and the non-linear equalizer 130 may be adjustable filters that can periodically adjusted to configure their processing implementations to meet changing conditions (e.g., changing filtering functionality of either the linear or non-linear equalizer as a result of changes to the channel conditions or filtering behavior of the transmitting device). The equalizers can also be implemented using programmable processors. The linear equalizer 128 and the non-linear equalizer 130 may be trainable modules with adjustable characteristics (e.g., adjustable parameters that are representative of their respective filtering/processing behavior) that can be adjusted based on a training sequence provided (periodically) with transmissions from the transmitting device 110. For example, in some embodiments, the linear equalizer is configured to be trained so as to derive channel estimation parameters (e.g., gain and phase estimates at multiple frequencies) using a training sequence. The derived channel estimation parameters are subsequently used to perform channel equalization for received signals from the transmitting device 110 to compensate for linear channel distortions.

Figure 2:
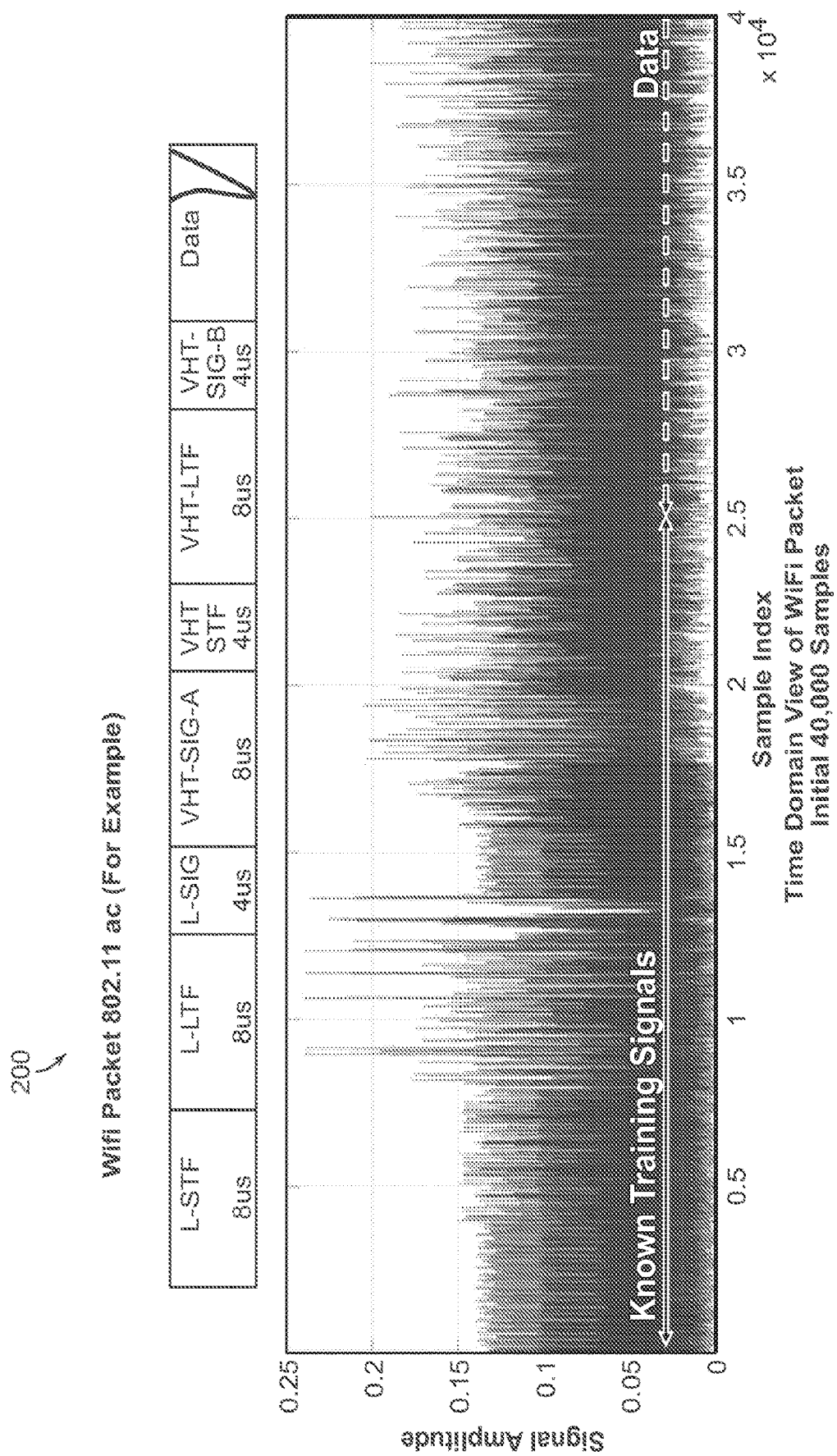
FIG. 2 is a diagram of an example WiFi 802.11ac packet configuration comprising a training data portion and regular data portion, with that packet configured to be used in a WiFi transmission such as the one shown in FIG. 2.

FIG. 2 includes a diagram 200 of an example WiFi 802.11ac packet configuration comprising a training data portion (the training sequence in the packet's preamble) and regular data portion. The packet may be used in WiFi transmissions. The training data portion may include several training data fields, including, for example, an L-STF field (legacy short training field), an L-LTF field (legacy long training field), an L-SIG field (Legacy Signal Field, which is used to provide rate and length information), a VHT-SIG-A field, a VHT-STF field (containing information relating to gain control estimation), VHT-LTF field (containing long training sequences for very high throughput devices), and a VHT-SIG-B field (which may include information about the length of the data, the modulation and coding scheme, etc.) Other training data configurations to facilitate derivation of a compensation function(s) (matrix) for a linear equalizer and/or a non-linear equalizer may be used. For example, the signals transmitted may include, in addition to the preamble, periodic pilot signals (e.g., at known instances, and with known pilot signal characteristics), that may allow a receiver device to make updates to its compensation functions (e.g., without performing the complete optimization processing to derive the entire set of adjustable characteristics, as described herein).

An example procedure to train a non-linear equalizer used in conjunction with a linear equalizer is described with reference to FIG. 1. As shown in FIG. 1, the receiver device 120 includes the linear equalizer 128 whose output is coupled to the input of the non-linear equalizer 130. The training of the linear equalizer 128 allows the determination of adjustable equalization characteristics (e.g., coefficients of channel estimation matrices, such as a matrix H) to perform signal compensation to correct for linear distortions affecting signals received by the receiver device. The same training sequence based on which the adjustable characteristics of the linear equalizer are derived are used to derive (jointly with, or separately from, the training of the linear equalizer) adjustable characteristics for the non-linear equalizer 130.

Particularly, in FIG. 1, a baseband signal (frame), f(t) is provided as input to the power amplifier 112 of the transmitting device 110 (note that for exposition, modulation of the baseband signal to a modulation frequency at the transmitter, and demodulation at the receiver are not illustrated in FIG. 1). The signal f(t) may include a preamble, $f_p(t)$, that includes a training sequence to allow receiver devices to adaptably be configured to compensate for signal distortions affecting signals transmitted by the transmitting device 110. As noted, the preamble $f_p(t)$ may be a first portion (e.g., first 44 μs of an 802.11ac WiFi packet) of the signal. The transmitting device processes/amplifies the signal f(t), resulting in an output signal g(t) which may include some non-linear terms caused by non-linear effects of, for example, the power amplifier 112. The transmitted signal g(t) can be treated as being a non-linear function T of the input signal f(t), and for the sake of exposition, it can be assumed that g(t) matches f(t) with only small non-linear effects g(t)=T(f(t))≈f(t)+(small non-linear terms). Of course, in practice, the transformation from f(t) to g(t) may also have significant linear aspects, which are addressed below.

The signal g(t) transmitted from the transmitting device 110 travels over the air and arrives at the receiving element of the device 120 as the signal x(t), which includes channel distortions of the signal g(t) caused by the channel conditions through which the signal g(t) is transmitted. For the sake of exposition, it is assumed that the over-the-air channel is adequately modeled as a linear channel, H, such that x(t)=H(g(t)). As introduced above, there may be linear effects in the channel at the transmitter, and therefore the linear channel H may essentially also include such effects. Therefore, the overall channel may be expressed as x(t)=H(T(f(t)))=(H∘T)(f(t)).

As further shown in FIG. 1, the signal y(t) is the output of the linear equalizer 128 processing the signal x(t), and thus may equalize the signal for the over-the-air channel effect. For example, in the illustration in which the linear channel is known or estimated as $\hat{H}$, then the linear equalizer applies the inverse of the channel to the received signal such that y(t)=$\hat{H}^{-1}$(x(t))≈g(t). The resultant signal y(t) is fed to the non-linear equalizer 130, to produce z(t) which is a corrected output compensated for non-linearity effects on the signals. For example, in the illustration in which the non-linear channel is known or estimated as $\hat{T}$, the output z(t)=$\hat{T}^{-1}$(y(t))≈f(t).

As introduced above, the transmitted frame signal f(t) includes a known preamble $f_p(t)$. The transformation $\hat{H}^{-1}$ can be derived based on the training sequence provided in the training preamble signal $f_p(t)$ (e.g., configured according to the configuration such as the one depicted in FIG. 2) to determine gains and phase as a function of frequency (i.e., to determine the coefficients of $\hat{H}^{-1}$), for example, as a complex number for each carrier of the transmitting device, such that $\|f_p(t)-y_p(t)\|$ is minimized over choice of $\hat{H}^{-1}$, where $y_p(t)$ is the output component of the equalizer corresponding to the remaining effects of the linear distortion. Then, the characteristics of $\hat{T}^{-1}$ are derived such that $\|f_p(t)-z_p(t)\|$ is minimized over the inverse function $\hat{T}^{-1}$. In some embodiments, the characteristics of $\hat{T}^{-1}$ may be derived by based on a linearly compensated version of the training preamble signal (i.e., to determine the adjustable characteristics for the non-linear equalizer operating on linearly equalized version of the signal, $f'_p(t)$, received by the receiver). In such examples, the characteristics of $\hat{T}^{-1}$ are derived such that $\|f'_p(t)-z_p(t)\|$ is minimized over the inverse function $\hat{T}^{-1}$. In such implementations, the minimization to determine the adjustable characteristics of the non-linear equalizer assumes that the samples produced by the non-linear equalizers correspond to signals that have undergone non-linear distortion (e.g., caused by the transmit channel of the remote transmitting device), linear distortion (e.g., caused due to channel distortion), and linear compensation (e.g., by the linear equalizer).

The linear equalizer may be parameterized in a variety of ways. For example, the equalizer may use a separate gain and phase estimate for each carrier frequency (e.g., OFDM subcarrier) of the channel. Alternately, parameters of a time domain filter, for example, an infinite impulse response or finite impulse response filter may be used. In some examples, the linear equalizer may be represented in the frequency domain, and as a matrix.

The non-linear equalizer may be parameterized in a variety of ways. For example, the non-linear equalizer may implement a memory polynomial, Volterra series, or other basis representation in which the transformation is represented by weights of the terms in the representation. For example, the signal provided to the non-linear equalizer (e.g., after linear equalization is performed on the signal received by the receiver to compensate for channel distortions), may be represented as a non-linear Volterra series functions:

$$y[n] = h_0 + \Sigma_p \Sigma_{\tau_1, \ldots, \tau_p} h_p(\tau_1, \ldots \tau_p) \Pi_{j=1 \ldots p} x[n-\tau_j]$$

In some examples, the non-linear function is a reduced set of Volterra terms, for example a delay polynomial:

$$y[n] = h_0 + \Sigma_p \Sigma_{\tau} h_p(\tau) x[n-\tau] |x[n-\tau]|^{(p-1)}$$

In such embodiments, the non-linear equalizer may be configured to determine weighing coefficients applied to the transformed representation that would compensate for the non-linear effects of the signals received by the receiver device. In some embodiments, to compensate for the non-linear effects of the transmit chain of the remote transmitting device, a relatively large number of terms of such a series representation may be needed, and the coefficients of those terms (e.g., $h_p$ terms) may need to be accurately set. The coefficients in such approaches may be continually updated to maintain good linearization.

For each received frame (e.g., in situations where the frames may be received from different wireless transmitters via different channels, or in situations where a training sequence is periodically transmitted), the parameters of the linear and non-linear equalizers may be updated based on the preamble, and the entire frame can be processed to produce the equalized signal z(t), which is further processed in a conventional manner, for example, to perform further compensation for effects such as carrier frequency offset, frame detection timing, and to decode the information in the frame. In some implementations, the parameters of the equalizers are based on multiple frames. For example, if the transmitting station is known and/or is stationary, then the parameters of the non-linear equalizer may be updated relatively more slowly or less often than on every received frame. On the other hand, if the transmitting device is moving relative to the receiver, the linear equalizer may be updated more frequently to accommodate changes in the over-the-air channel.

Note that the determination of the parameters of the linear equalizer (i.e., the parameters of $\hat{H}^{-1}$) may be determined without regard to the non-linear effects because $y_p(t)$ is matched against the known $f_p(t)$ and not the unknown $g_p(t)$. However, to the extent that the non-linear function $\hat{H}^{-1}$ can capture both linear and non-linear effects, such a potentially sub-optimal choice of $\hat{H}^{-1}$ may not have a significant effect.

In some embodiments, the correction function (to correct linear and non-linear distortions) can be derived jointly. For example, the receiver may iteratively (e.g., alternating between the linear and non-linear equalizer) update its estimate of $\hat{H}^{-1}$ as well as its estimate of $\hat{T}^{-1}$ according to the achieved $z_p(t)$ to minimize $\|f_p(t) - z_p(t)\|$. In such embodiments, a combined equalizer, which implements a joint parameterization function, S(t), configured to take samples of x(t) (i.e., the input signal of the receiver device) and produce samples of z(t), is minimized. The structure of S may be equivalent to the composition of $T^{-1} \circ \hat{H}^{-1}$, and is optimized (e.g., determine the adjustable parameters or coefficients of the joint correction matrix S) to minimize the expression $\|f_p(t) - z_p(t)\|$. Where a joint function is derived, a single set of adjustable characteristics may be produced, which incorporates the characteristics for the linear equalizer and the characteristics for non-linear equalizer. The joint derivation can also produce separate parameters for each of the linear and non-linear equalizers. Different optimization techniques (e.g., based on a least-squares process, or some other optimization procedure) may be used to determine the choice of parameters implemented by the linear equalizer and/or the non-linear equalizer.

In some variations, to aide and expedite the optimization process that is used to derive the equalization/compensation functions (i.e., derive the coefficients that represent the filtering operations of the linear and/or non-linear equalizers of the receiver device), the receiver device may include a database or repository that includes sets of coefficients that can be selected or otherwise used as starting values for the optimization process (i.e., to identify coefficients/parameters that minimize the expression $\|f_p(t) - z_p(t)\|$). The selected set of coefficients/parameters may alternatively be used as approximations for the signal compensation functions to be realized. A variety of approaches may be implemented by to select the set of coefficients to be used as an approximation of the compensation function or as a starting point for the optimization process (based on training data in received signals). Such approaches include selection and/or interpolation of coefficient values in the database according to the received inputs, and/or applying a mathematical mapping of the input represented by values in the coefficient database. For example, in some embodiments, a coefficient estimator/interpolator (not shown) may be configured to select, from a plurality of sets of compensation coefficients (in a database; not shown), one or more compensation coefficient sets that are associated with operating point information that most closely match the current operating point information. Examples of operating point information include identification data (e.g., device type data identifying the type of devices transmitting or receiving the signals), training data values, distortions metrics (e.g., indicative of the measured energy distribution in an associated bandwidth for the signal versus the expected distribution), various environmental conditions and other operating point parameters (e.g., voltage/current levels, temperature, etc., for the transmitting and/or receiver devices), and/or other types of system characteristic values. In some embodiments, the compensation coefficients used to control/adjust the linear equalizer and/or the non-linear equalizer may be determined by selecting two or more sets of compensation coefficients from a plurality of coefficient sets in the database, based on received input data. Further details regarding selection of coefficients (e.g., using a coefficient database) are provided in U.S. Pat. No. 9,590,668, entitled "Digital Compensator", the content of which is hereby incorporated by reference in its entirety. The latter patent discusses methodologies for selecting DPD coefficients from a database to implement pre-distortion techniques. Similar methodologies to use and manage a database of coefficients may be applied in the present case of linear and non-linear signal equalization processing for received wireless signals. The determination of compensation functions to be used by linear and non-linear equalizers may be implemented on a sample-by-sample basis (e.g., for each packet), or may be applied more infrequently (e.g., once every few seconds, or once in some longer time interval if the devices communicating are substantially stationary).

Figure 3:
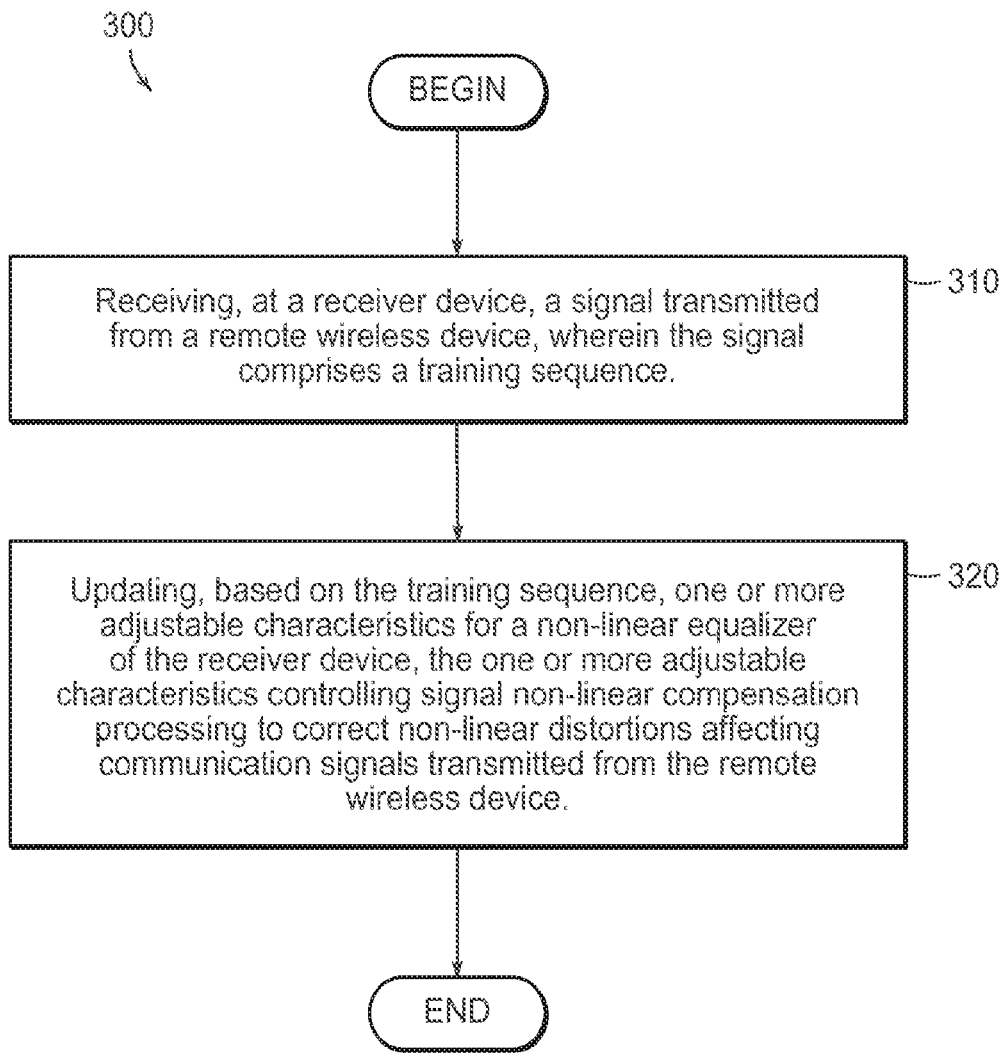
FIG. 3 is a flowchart of an example procedure to facilitate implementation of signal compensation function determination.

With reference now to FIG. 3, a flowchart of an example procedure 300 to facilitate implementation of signal compensation function(s) determination, is shown. The procedure 300 may be performed at a network node (such as a WLAN access point) or at a mobile device in communication with a network node. The procedure 300 may be performed offline (e.g., at some earlier point of time prior to receipt of new signals on which the realized processing is to be applied) or on-line (e.g., substantially in real-time, with the on-line processing providing, in some embodiments, approximations using results computed offline). The procedure 300 includes receiving 310, at a receiver device (e.g., a personal mobile device, or a network node), a signal transmitted from a remote wireless device, with the signal including a training sequence (e.g., a training preamble of the signal). In some embodiments, receiving the signal transmitted from the remote wireless device may include receiving a WiFi packet comprising known training signals (e.g., training signals provided in fields configured like the WiFi 802.11ac packet diagram shown in FIG. 2).

As further shown in FIG. 3, the procedure 300 additionally includes updating 320, based on the training sequence, one or more adjustable characteristics for a non-linear equalizer of the receiver device, the one or more adjustable characteristics controlling signal non-linear compensation processing to correct non-linear distortions affecting communication signals transmitted from the remote wireless device.

In some embodiments, the method may further include updating, based on the training sequence, additional one or more adjustable characteristics for a linear equalizer of the receiver device (such a linear equalizer may be located upstream from the non-linear equalizer, as seen from the receiving element of the receiver device), with the additional one or more adjustable characteristics controlling signal linear compensation processing to correct linear distortions affecting the communication signals. Thus, the same training sequence may be used to determine characteristics/coefficients of the linear and non-linear equalizers. In some examples, updating the additional one or more adjustable characteristics for the linear equalizer may include deriving channel estimation parameters using the training sequence, with the channel estimation parameters comprising gain and phase estimates at one or more frequencies, and applying linear distortion compensation to subsequent signals received at the receiver device according to the derived channel estimation parameters. As noted, in some embodiments, updating the one or more adjustable characteristics for the non-linear equalizer may be performed jointly with updating of adjustable characteristics to control signal linear compensation processing. In such embodiments, a single set of adjustable characteristics (incorporating the linear and non-linear compensation functionality) may be derived. Alternatively, separate sets of characteristics may be derived for each of the non-linear equalizer and the linear equalizer.

In some examples, updating the one or more adjustable characteristics for the non-linear equalizer of the receiver device may include updating digital filter parameters to compensate for transmit chain non-linear distortions caused by a transmit chain of the remote wireless device through an optimization process that minimizes an error between pre-determined samples of the training sequence and observed samples at the output of the non-linear equalizer. In some implementations, updating the one or more adjustable characteristics for the non-linear equalizer of the receiver device may include updating digital filter parameters to compensate for transmit chain non-linear distortions caused by a transmit chain of the remote wireless device through an optimization process that minimizes an error between pre-determined samples of the training sequence processed by a linear equalizer located upstream from the non-linear equalizer, and observed samples at an output of the non-linear equalizer.

In some examples, updating, based on the training sequence, the one or more adjustable characteristics for the non-linear equalizer of the receiver device may include selecting from a plurality of sets of pre-determined adjustable characteristics, based on one or more system characteristics representative of operating points of at least one of the remote wireless device or the receiver device, two or more sets of pre-determined adjustable characteristics, and determining an interpolated set of adjustable characteristics from the selected two or more sets of pre-determined adjustable characteristics.

In some embodiments, the training sequence may be a preamble of a data frame, with the data frame further including a data body portion. In such embodiments, the method may further include processing the data body portion of the data frame according to the updated one or more adjustable characteristics to correct non-linear distortions affecting the data body portion. In some embodiments, the training sequence may include period pilot signals with known pilot signal characteristics.

Figure 4:
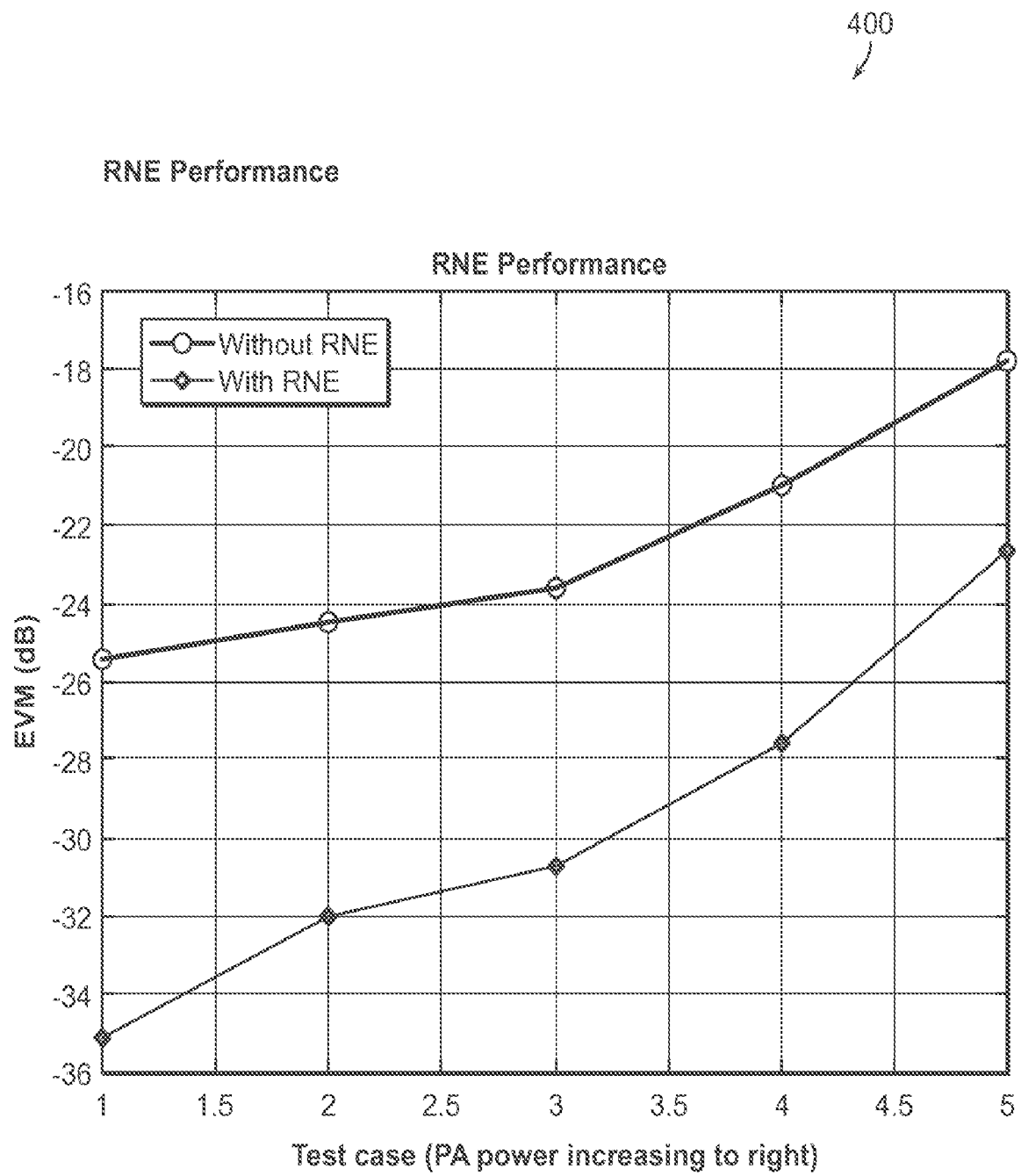
FIG. 4 is a graph providing a comparison of signal processing performance for a receiver device with and without a receiver non-linear equalizer.

FIG. 4 includes a graph 400 providing a comparison of signal processing performance for a receiver device with and without a receiver non-linear equalizer (that may have been configured using the same training data used to configure a linear equalizer). As shown in FIG. 4, the use of a non-linear equalizer (in conjunction with a linear equalizer) results in improved signal processing performance (measured, in the example of FIG. 4 using EVM metrics).

Figure 5:
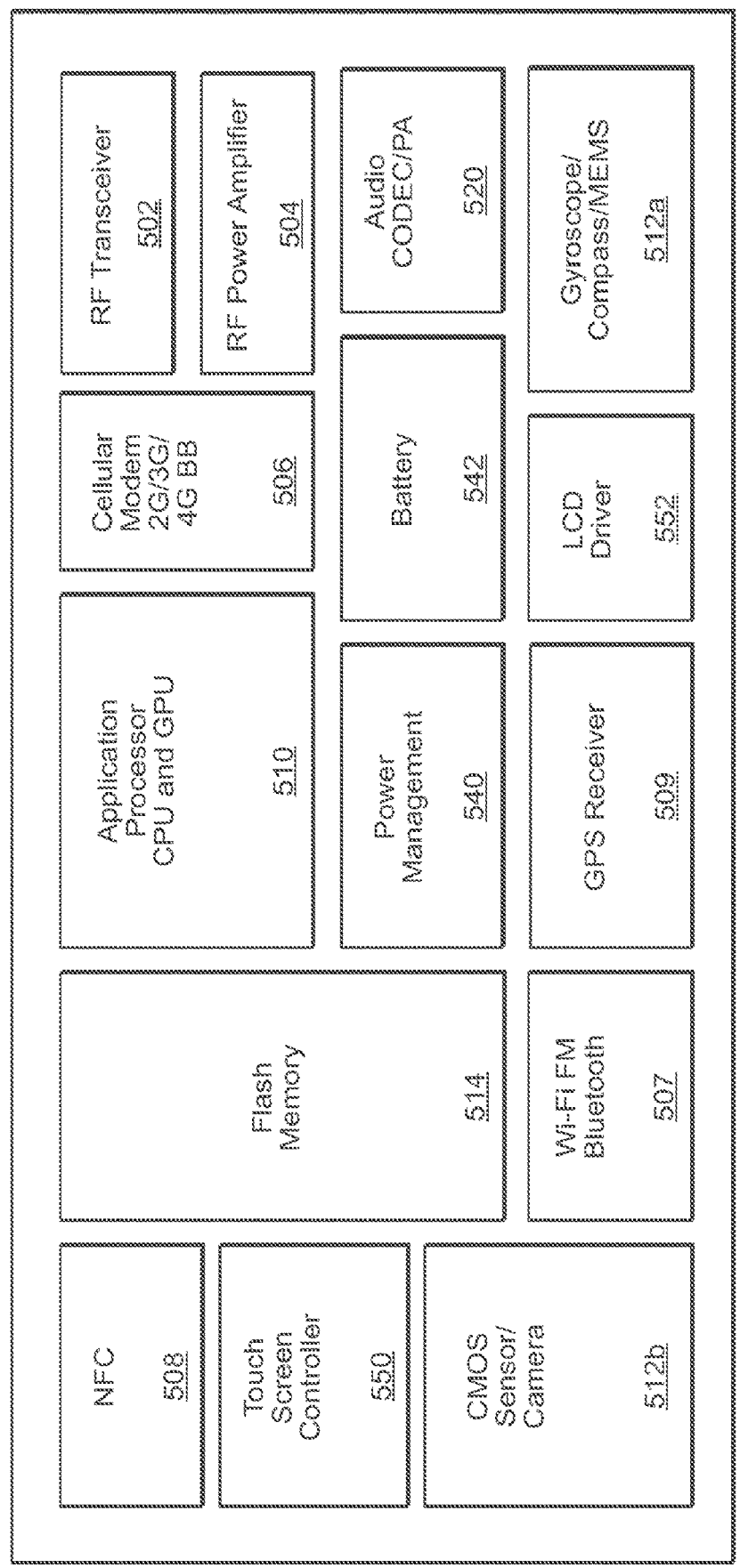
FIG. 5 is a schematic diagram of an example device which may be used to implement signal compensation (equalization) functionality.

With reference next to FIG. 5, a schematic diagram of an example device 500 (e.g., a mobile device or handset, although a similar configuration may also be used to implement a network node, such as a WLAN access point or a WWAN base station, etc.), which may be used to implement, or which may include, the system 100 depicted in FIG. 1, is shown. It is to be noted that one or more of the modules and/or functions illustrated in the example device of FIG. 5 may be further subdivided, or two or more of the modules or functions illustrated in FIG. 5 may be combined. Additionally, one or more of the modules or functions illustrated in FIG. 5 may be excluded. The various modules and components of the device 500 may be connected through a bus or through other electrical connections and interfaces (not shown in FIG. 5).

The example device 500 may include an RF transceiver 502 (also referred to as an RF communication module) comprising one or more RF transceivers that may be connected to one or more antennas and to an RF front end unit comprising, for example, an RF power amplifier 504, and a cellular modem 506. The RF amplifier may include, in some embodiments, the amplification and digital predistortion circuitry to mitigate non-linear behavior caused by the amplifier or other elements of a transmit chain. The modem circuitry implemented by the cellular modem 506 is generally configured to perform modulation and demodulation operations for wireless signals in various bands and for various communication protocols (including 2G, 3G, 4G, 5G, and various other communication technologies in licensed and unlicensed bands). The RF front end circuitry, which may comprise the blocks 504 and 506 depicted in FIG. 5, may thus include power amplifiers, LNAs, digital-to-analog converters, analog-to-digital converters, filters, switches and other RF front-end modules, and, in some embodiments, at least some of the RF front end modules may be arranged to realize, at least in part, the system implementation 100 described herein. The transceivers of the RF transceiver block 502 may comprise suitable devices, hardware, and/or software for communicating with and/or detecting signals to/from a network or remote devices. In some embodiments, the RF transceiver 502 may support wireless LAN communication (e.g., WLAN, such as WiFi-based communications) to thus cause the device 500 to be part of a WLAN. In some embodiments, the RF transceiver 502 may also support the device 500 to communicate with one or more cellular access points (also referred to as a base station), which may be used for wireless voice and/or data communication. The transceiver 502 may be used to communicate according to any type of WWAN or WLAN protocol, including any 3GPP or IEEE standards (implemented over licensed and unlicensed frequency bands).

In some implementations, short range communication may be realized through dedicated circuitry such as the circuitry implemented by a WiFi FM Bluetooth module 507. The module 507 may thus be configured to allow the device 500 to communicate with in-range remote devices configured according to any short-range communication protocol. In addition, the device 500 may also include a wired network connection (e.g., implemented using a USB port, or some other wired port) to communicate with another device. Another communication module that may be included with the device 500 is a near-field communication (NFC) module 508 configured to allow communication with neighboring device according to NFC protocols. In some variations, the device 500 may also include a GPS receiver 509 connected to one or more antennas, and configured to receive satellite signals. The GPS receiver 509 may comprise any suitable hardware and/or software for receiving and processing GPS signals from satellite vehicles. The GPS receiver 509 may request information as appropriate from the other systems, and may perform the computations necessary to determine the device's 500 position using, in part, measurements obtained by any suitable satellite positioning system (SPS) procedure. Such positioning information may be used, for example, to determine the location and motion of the device 500.

With continued reference to FIG. 5, the device 500 may include one or more sensors that communicate, through wired or wireless communication links, with a controller/processor 510 (comprising, for example, an application processor CPU and GPU). The one or more sensors may include motion sensors (also referred to as orientation or inertial sensors), such as a gyroscope/compass sensor 512a, that may be implemented using micro-electro-mechanical systems (MEMS) technology. Other examples of motion sensors include an accelerometer, a magnetometer, etc. Another type of sensor that may be used is an audio sensor (e.g., a microphone) to record voice or sound information (which may then be converted to audio data via an audio CODEC/PA module 520, with the audio data then optionally transmitted to a remote device via the front end circuitry and the RF transceiver 502 or one of the other communication modules of the device 500). Also illustrated in FIG. 5 is a CMOS sensor/camera 512b configured to capture and record optical/light signals to produce still or moving images. Other types of sensors may also be included with the device 500.

The controller/processor 510 may be connected to the various communication modules and/or the front end circuitry, and to the various sensors. As noted, the controller may include one or more microprocessors, microcontrollers, and/or digital signal processors that provide processing functions, as well as other computation and control functionality. The device 500 may also include special purpose logic circuitry, e.g., an FPGA (field programmable gate array), an ASIC (application-specific integrated circuit), a DSP processor, a graphics processing unit (GPU), an accelerated processing unit (APU), an application processor, customized dedicated circuitry, etc., to implement, at least in part, the processes and functionality for the device 500. The controller 510 may be coupled to a memory 514 (shown in FIG. 5 as flash memory) for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc.

The device 500 may be configured to (e.g., via hardware resident in the device and/or software modules/applications provided on the memory 514) to implement a process to adjust/update a non-linear equalizer trainable using a training set that can also be used to train a linear equalizer (e.g., according to the procedures described herein, including the procedures depicted in relation to FIG. 3). For example, the device 500 may be configured to receive a signal transmitted from a remote wireless device, with the signal comprising a training sequence, and to update, based on the training sequence, one or more adjustable characteristics for a non-linear equalizer (e.g., implemented on or by the device 500) of the receiver device, with the one or more adjustable characteristics controlling signal non-linear compensation processing to correct non-linear distortions affecting communication signals transmitted from the remote wireless device. The memory 514 may be on-board the controller 510 (e.g., within the same IC package), and/or may be external memory to the processor and coupled thereto over a data bus.

The example device 500 may further include a user interface which provides any suitable interface systems, such as a microphone/speaker (which may be included with the Audi CODEC/PA module 520), keypad or a touchscreen 550 (or some other user-interface input mechanism), and a display 552 (shown as LCD Driver) that allows user interaction with the device 500. Such a user interface, be it an audiovisual interface (e.g., a display and speakers), or some other type of interface (visual-only, audio-only, tactile, etc.), configured to provide status data, alert data, and so on, to a user using the device 500. The microphone/speaker facilitates for voice communication functionality, and may also include or be coupled to a speech synthesizer (e.g., a text-to-speech module) that can convert text data to audio speech so that the user can receive audio notifications. Such a speech synthesizer may be a separate module, or may be integrally coupled to the microphone/speaker or to the controller 510 of the device of FIG. 5. The input interface (that includes the touchscreen controller 550) may further include suitable buttons for user input. The display (controlled by the LCD Driver 552) may include any suitable display, such as, for example, a backlit LCD display.

The device 500 may further include a power management unit 540 that controls power consumption of the device provided through a power storage device 542 (e.g., a battery) coupled to the power management unit. In some embodiments, the power management unit 540 may include (or may regulate) a power conversion module that receives and regulates power from an outside source (e.g., AC power), with such received power being used to recharge the battery 542.

The above implementations, as illustrated in FIGS. 1-5, are applicable to a wide range of technologies that include RF technologies (including WWAN technologies, such as cellular technologies, and WLAN technologies), satellite communication technologies, cable modem technologies, wired network technologies, optical communication technologies, and all other RF and non-RF communication technologies. The implementations described herein encompass all techniques and embodiments that pertain to use of linear and non-linear equalizers in various different communication systems.

In some implementations in which multiple-input-multiple-output (MIMO) approaches are used to separate received signals from different transmitters, the linear equalizer may be integrated into MIMO decoding, and a separate non-linear equalizer may be implemented for each of the decoded signals.

In some implementations, a computer accessible non-transitory storage medium includes a database (also referred to a "design structure" or "integrated circuit definition dataset") representative of a system including some or all of components of a receiver device, including a linear equalizer and/or a non-linear equalizer of such a receiver device. Generally speaking, a computer accessible storage medium may include any non-transitory storage media accessible by a computer during use to provide instructions and/or data to the computer. For example, a computer accessible storage medium may include storage media such as magnetic or optical disks and semiconductor memories. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represents the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, the database may itself be the netlist (with or without the synthesis library) or the data set.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limit the scope of the invention, which is defined by the scope of the appended claims. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
    receiving, at a receiver device, a signal transmitted from a remote wireless device, wherein the signal comprises a training sequence;
    updating, based on the training sequence, one or more adjustable characteristics for a non-linear equalizer of the receiver device, the one or more adjustable characteristics controlling signal non-linear compensation processing to correct non-linear distortions caused by the remote wireless device that affect communication signals transmitted from the remote wireless device; and
    updating, based on the same training sequence to update the one or more adjustable characteristics for the non-linear equalizer, additional one or more adjustable characteristics for a linear equalizer of the receiver device, the additional one or more adjustable characteristics controlling signal linear compensation processing to correct linear distortions caused by channel distortions of a channel, through which the signal communicated from the remote wireless device travels to the receiver device, affecting the communication signals.

2. The method of claim 1, wherein updating the one or more adjustable characteristics comprises:
    jointly updating, based on the training sequence, the one or more adjustable characteristics for the non-linear equalizer and the additional one or more adjustable characteristics for the linear equalizer of the receiver device.

3. The method of claim 1, wherein receiving the signal transmitted from the remote wireless device comprises:
    receiving a WiFi packet comprising known training signals.

4. The method of claim 1, wherein the non-linear equalizer is located downstream from the linear equalizer of the receiver device.

5. The method of claim 1, wherein the training sequence is a preamble of a data frame, with the data frame further comprising a data body portion, and wherein the method further comprises:
    processing the data body portion of the data frame according to the updated one or more adjustable characteristics to correct non-linear distortions affecting the data body portion.

6. The method of claim 1, wherein updating the one or more adjustable characteristics for the non-linear equalizer of the receiver device comprises:
    updating digital filter parameters to compensate for transmit chain non-linear distortions caused by a transmit chain of the remote wireless device through an optimization process that minimizes an error between pre-determined samples of the training sequence and observed samples at an output of the non-linear equalizer.

7. The method of claim 1, wherein updating the one or more adjustable characteristics for the non-linear equalizer of the receiver device comprises:
updating digital filter parameters to compensate for transmit chain non-linear distortions caused by a transmit chain of the remote wireless device through an optimization process that minimizes an error between pre-determined samples of the training sequence processed by the linear equalizer located upstream from the non-linear equalizer, and observed samples at an output of the non-linear equalizer.

8. The method of claim 1, wherein the training sequence comprises period pilot signals with known pilot signal characteristics.

9. A method comprising:
receiving, at a receiver device, a signal transmitted from a remote wireless device, wherein the signal comprises a training sequence;
updating, based on the training sequence, one or more adjustable characteristics for a non-linear equalizer of the receiver device, the one or more adjustable characteristics controlling signal non-linear compensation processing to correct non-linear distortions affecting communication signals transmitted from the remote wireless device; and
updating, based on the training sequence, additional one or more adjustable characteristics for a linear equalizer of the receiver device, the additional one or more adjustable characteristics controlling signal linear compensation processing to correct linear distortions affecting the communication signals;
wherein updating the additional one or more adjustable characteristics for the linear equalizer comprises:
deriving channel estimation parameters using the training sequence, wherein the channel estimation parameters comprise gain and phase estimates at one or more frequencies; and
applying linear distortion compensation to subsequent signals received at the receiver device according to the derived channel estimation parameters.

10. The method of claim 9, wherein updating the one or more adjustable characteristics comprises:
jointly updating, based on the training sequence, the one or more adjustable characteristics for the non-linear equalizer and the additional one or more adjustable characteristics for the linear equalizer of the receiver device.

11. The method of claim 9, wherein updating the one or more adjustable characteristics for the non-linear equalizer of the receiver device comprises:
updating digital filter parameters to compensate for transmit chain non-linear distortions caused by a transmit chain of the remote wireless device through an optimization process that minimizes an error between pre-determined samples of the training sequence and observed samples at an output of the non-linear equalizer.

12. The method of claim 9, wherein updating the one or more adjustable characteristics for the non-linear equalizer of the receiver device comprises:
updating digital filter parameters to compensate for transmit chain non-linear distortions caused by a transmit chain of the remote wireless device through an optimization process that minimizes an error between pre-determined samples of the training sequence processed by the linear equalizer located upstream from the non-linear equalizer, and observed samples at an output of the non-linear equalizer.

13. The method of claim 9, wherein updating, based on the training sequence, the one or more adjustable characteristics for the non-linear equalizer of the receiver device comprises:
selecting from a plurality of sets of pre-determined adjustable characteristics, based on one or more system characteristics representative of operating points of at least one of the remote wireless device or the receiver device, two or more sets of pre-determined adjustable characteristics; and
determining an interpolated set of adjustable characteristics from the selected two or more sets of pre-determined adjustable characteristics.

14. A method comprising:
receiving, at a receiver device, a signal transmitted from a remote wireless device, wherein the signal comprises a training sequence; and
updating, based on the training sequence, one or more adjustable characteristics for a non-linear equalizer of the receiver device, the one or more adjustable characteristics controlling signal non-linear compensation processing to correct non-linear distortions affecting communication signals transmitted from the remote wireless device;
wherein updating, based on the training sequence, the one or more adjustable characteristics for the non-linear equalizer of the receiver device comprises:
selecting from a plurality of sets of pre-determined adjustable characteristics, based on one or more system characteristics representative of operating points of at least one of the remote wireless device or the receiver device, two or more sets of pre-determined adjustable characteristics; and
determining an interpolated set of adjustable characteristics from the selected two or more sets of pre-determined adjustable characteristics.

15. The method of claim 14, further comprising:
updating, based on the training sequence, additional one or more adjustable characteristics for a linear equalizer of the receiver device, the additional one or more adjustable characteristics controlling signal linear compensation processing to correct linear distortions affecting the communication signals.

16. The method of claim 15, wherein updating the additional one or more adjustable characteristics for the linear equalizer comprises:
deriving channel estimation parameters using the training sequence, wherein the channel estimation parameters comprise gain and phase estimates at one or more frequencies; and
applying linear distortion compensation to subsequent signals received at the receiver device according to the derived channel estimation parameters.

17. The method of claim 14, wherein updating the one or more adjustable characteristics for the non-linear equalizer of the receiver device comprises:
updating digital filter parameters to compensate for transmit chain non-linear distortions caused by a transmit chain of the remote wireless device through an optimization process that minimizes an error between pre-determined samples of the training sequence and observed samples at an output of the non-linear equalizer.

18. A receiver device comprising:
a communication module to receive a signal transmitted from a remote wireless device, wherein the signal comprises a training sequence;
a non-linear equalizer configured to perform non-linear signal compensation to correct non-linear distortions caused by the remote wireless device that affect communication signals transmitted from the remote wireless device;
a controller configured to update, based on the training sequence, one or more adjustable characteristics for the non-linear equalizer of the receiver device, the one or more adjustable characteristics controlling signal non-linear compensation processing performed by the non-linear equalizer; and
a linear equalizer configured to perform linear signal compensation to correct linear distortions caused by channel distortions of a channel, through which the signal communicated from the remote wireless device travels to the receiver device, affecting the communication signals transmitted from the remote wireless device, wherein the controller is further configured to update, based on the same training sequence to update the one or more adjustable characteristics for the non-linear equalizer, additional one or more adjustable characteristics for the linear equalizer, the additional one or more adjustable characteristics controlling signal linear compensation processing performed by the linear equalizer.

19. The receiver device of claim 18, wherein the controller configured to update the one or more adjustable characteristics is configured to:
jointly update, based on the training sequence, the one or more adjustable characteristics for the non-linear equalizer and the additional one or more adjustable characteristics for the linear equalizer of the receiver device.

20. The receiver device of claim 18, wherein the communication module configured to receive the signal transmitted from the remote wireless device is configured to:
receive a WiFi packet comprising known training signals.

21. The receiver device of claim 18, wherein the non-linear equalizer is located downstream from the linear equalizer of the receiver device.

22. The receiver device of claim 18, wherein the training sequence is a preamble of a data frame, with the data frame further comprising a data body portion, and wherein the controller is further configured to:
process the data body portion of the data frame according to the updated one or more adjustable characteristics to correct non-linear distortions affecting the data body portion.

23. The receiver device of claim 18, wherein the controller configured to update the one or more adjustable characteristics for the non-linear equalizer of the receiver device is configured to:
update digital filter parameters to compensate for transmit chain non-linear distortions caused by a transmit chain of the remote wireless device through an optimization process that minimizes an error between pre-determined samples of the training sequence and observed samples at an output of the non-linear equalizer.

24. The receiver device of claim 18, wherein the controller configured to update the one or more adjustable characteristics for the non-linear equalizer of the receiver device is configured to:
update digital filter parameters to compensate for transmit chain non-linear distortions caused by a transmit chain of the remote wireless device through an optimization process that minimizes an error between pre-determined samples of the training sequence processed by the linear equalizer located upstream from the non-linear equalizer, and observed samples at an output of the non-linear equalizer.

25. The receiver device of claim 18, wherein the training sequence comprises period pilot signals with known pilot signal characteristics.

26. A receiver device comprising:
a communication module to receive a signal transmitted from a remote wireless device, wherein the signal comprises a training sequence;
a non-linear equalizer configured to perform non-linear signal compensation to correct non-linear distortions affecting communication signals transmitted from the remote wireless device;
a controller configured to update, based on the training sequence, one or more adjustable characteristics for the non-linear equalizer of the receiver device, the one or more adjustable characteristics controlling signal non-linear compensation processing performed by the non-linear equalizer; and
a linear equalizer, located upstream from the non-linear equalizer, and configured to perform linear signal compensation to correct linear distortions affecting the communication signals transmitted from the remote wireless device, wherein the controller is further configured to update, based on the training sequence, additional one or more adjustable characteristics for the linear equalizer, the additional one or more adjustable characteristics controlling signal linear compensation processing performed by the linear equalizer;
wherein the controller configured to update the additional one or more adjustable characteristics for the linear equalizer is configured to:
derive channel estimation parameters using the training sequence, wherein the channel estimation parameters comprise gain and phase estimates at one or more frequencies; and
apply linear distortion compensation to subsequent signals received at the receiver device according to the derived channel estimation parameters.

27. The receiver device of claim 26, wherein the controller configured to update the one or more adjustable characteristics for the non-linear equalizer of the receiver device is configured to:
update digital filter parameters to compensate for transmit chain non-linear distortions caused by a transmit chain of the remote wireless device through an optimization process that minimizes an error between pre-determined samples of the training sequence and observed samples at an output of the non-linear equalizer.

28. The receiver device of claim 26, wherein the controller configured to update the one or more adjustable characteristics for the non-linear equalizer of the receiver device is configured to:
update digital filter parameters to compensate for transmit chain non-linear distortions caused by a transmit chain of the remote wireless device through an optimization process that minimizes an error between pre-determined samples of the training sequence processed by a linear equalizer located upstream from the non-linear equalizer, and observed samples at an output of the non-linear equalizer.

29. The receiver device of claim 26, wherein the controller configured to update, based on the training sequence, the one or more adjustable characteristics for the non-linear equalizer of the receiver device is configured to:
   select from a plurality of sets of pre-determined adjustable characteristics, based on one or more system characteristics representative of operating points of at least one of the remote wireless device or the receiver device, two or more sets of pre-determined adjustable characteristics; and
   determine an interpolated set of adjustable characteristics from the selected two or more sets of pre-determined adjustable characteristics.

30. A receiver device comprising:
   a communication module to receive a signal transmitted from a remote wireless device, wherein the signal comprises a training sequence;
   a non-linear equalizer configured to perform non-linear signal compensation to correct non-linear distortions affecting communication signals transmitted from the remote wireless device; and
   a controller configured to update, based on the training sequence, one or more adjustable characteristics for the non-linear equalizer of the receiver device, the one or more adjustable characteristics controlling signal non-linear compensation processing performed by the non-linear equalizer;
   wherein the controller configured to update, based on the training sequence, the one or more adjustable characteristics for the non-linear equalizer of the receiver device is configured to:
      select from a plurality of sets of pre-determined adjustable characteristics, based on one or more system characteristics representative of operating points of at least one of the remote wireless device or the receiver device, two or more sets of pre-determined adjustable characteristics; and
      determine an interpolated set of adjustable characteristics from the selected two or more sets of pre-determined adjustable characteristics.

31. The receiver device of claim 30, further comprising:
   a linear equalizer configured to perform linear signal compensation to correct linear distortions affecting the communication signals transmitted from the remote wireless device, wherein the controller is further configured to update, based on the training sequence, additional one or more adjustable characteristics for the linear equalizer, the additional one or more adjustable characteristics controlling signal linear compensation processing performed by the linear equalizer.

32. The receiver device of claim 31, wherein the controller configured to update the additional one or more adjustable characteristics for the linear equalizer is configured to:
   derive channel estimation parameters using the training sequence, wherein the channel estimation parameters comprise gain and phase estimates at one or more frequencies; and
   apply linear distortion compensation to subsequent signals received at the receiver device according to the derived channel estimation parameters.

33. The receiver device of claim 30, wherein the controller configured to update the one or more adjustable characteristics for the non-linear equalizer of the receiver device is configured to:
   update digital filter parameters to compensate for transmit chain non-linear distortions caused by a transmit chain of the remote wireless device through an optimization process that minimizes an error between pre-determined samples of the training sequence and observed samples at an output of the non-linear equalizer.

34. A non-transitory machine-readable medium having a design structure encoded thereon, said design structure comprising elements that, when processed in a computer-aided design system, generate a machine-executable representation of a receiver device, the receiver device comprising:
   a communication module to receive a signal transmitted from a remote wireless device, wherein the signal comprises a training sequence;
   a non-linear equalizer configured to perform non-linear signal compensation to correct non-linear distortions caused by the remote wireless device that affect communication signals transmitted from the remote wireless device;
   a controller configured to update, based on the training sequence, one or more adjustable characteristics for the non-linear equalizer of the receiver device, the one or more adjustable characteristics controlling signal non-linear compensation processing performed by the non-linear equalizer; and
   a linear equalizer configured to perform linear signal compensation to correct linear distortions caused by channel distortions of a channel, through which the signal communicated from the remote wireless device travels to the receiver device, affecting the communication signals transmitted from the remote wireless device, wherein the controller is further configured to update, based on the same training sequence to update the one or more adjustable characteristics for the non-linear equalizer, additional one or more adjustable characteristics for the linear equalizer, the additional one or more adjustable characteristics controlling signal linear compensation processing performed by the linear equalizer.

35. A method comprising:
   receiving, at a receiver device, a signal transmitted from a remote wireless device, wherein the signal comprises a training sequence; and
   updating, based on the training sequence, one or more adjustable characteristics for a non-linear equalizer of the receiver device, the one or more adjustable characteristics controlling signal non-linear compensation processing to correct non-linear distortions caused by the remote wireless device that affect communication signals transmitted from the remote wireless device, wherein updating the one or more adjustable characteristics for the non-linear equalizer of the receiver device comprises:
      updating digital filter parameters to compensate for transmit chain non-linear distortions caused by a transmit chain of the remote wireless device through an optimization process that minimizes an error between pre-determined samples of the training sequence processed by a linear equalizer located upstream from the non-linear equalizer, and observed samples at an output of the non-linear equalizer.

36. The method of claim 35, wherein updating the one or more adjustable characteristics comprises:
   jointly updating, based on the training sequence, the one or more adjustable characteristics for the non-linear equalizer and for additional one or more adjustable characteristics for the linear equalizer of the receiver device.

37. The method of claim 35, wherein receiving the signal transmitted from the remote wireless device comprises:
receiving a WiFi packet comprising known training signals.

38. The method of claim 35, wherein the non-linear equalizer is located downstream from the linear equalizer of the receiver device.

39. The method of claim 35, wherein the training sequence is a preamble of a data frame, with the data frame further comprising a data body portion, and wherein the method further comprises:
processing the data body portion of the data frame according to the updated one or more adjustable characteristics to correct non-linear distortions affecting the data body portion.

40. The method of claim 35, wherein updating the one or more adjustable characteristics for the non-linear equalizer of the receiver device comprises:
updating digital filter parameters to compensate for transmit chain non-linear distortions caused by a transmit chain of the remote wireless device through an optimization process that minimizes an error between pre-determined samples of the training sequence and observed samples at an output of the non-linear equalizer.

41. The method of claim 35, wherein the training sequence comprises period pilot signals with known pilot signal characteristics.

42. A receiver device comprising:
a communication module to receive a signal transmitted from a remote wireless device, wherein the signal comprises a training sequence;
a non-linear equalizer configured to perform non-linear signal compensation to correct non-linear distortions caused by the remote wireless device that affect communication signals transmitted from the remote wireless device; and
a controller configured to update, based on the training sequence, one or more adjustable characteristics for the non-linear equalizer of the receiver device, the one or more adjustable characteristics controlling signal non-linear compensation processing performed by the non-linear equalizer, wherein the controller configured to update the one or more adjustable characteristics for the non-linear equalizer of the receiver device is configured to:
update digital filter parameters to compensate for transmit chain non-linear distortions caused by a transmit chain of the remote wireless device through an optimization process that minimizes an error between pre-determined samples of the training sequence processed by a linear equalizer located upstream from the non-linear equalizer, and observed samples at an output of the non-linear equalizer.

43. The receiver device of claim 42, wherein the controller configured to update the one or more adjustable characteristics is configured to:
jointly update, based on the training sequence, the one or more adjustable characteristics for the non-linear equalizer and additional one or more adjustable characteristics for the linear equalizer of the receiver device.

44. The receiver device of claim 42, wherein the communication module configured to receive the signal transmitted from the remote wireless device is configured to:
receive a WiFi packet comprising known training signals.

45. The receiver device of claim 42, wherein the non-linear equalizer is located downstream from the linear equalizer of the receiver device.

46. The receiver device of claim 42, wherein the training sequence is a preamble of a data frame, with the data frame further comprising a data body portion, and wherein the controller is further configured to:
process the data body portion of the data frame according to the updated one or more adjustable characteristics to correct non-linear distortions affecting the data body portion.

47. The receiver device of claim 42, wherein the controller configured to update the one or more adjustable characteristics for the non-linear equalizer of the receiver device is configured to:
update digital filter parameters to compensate for transmit chain non-linear distortions caused by a transmit chain of the remote wireless device through an optimization process that minimizes an error between pre-determined samples of the training sequence and observed samples at an output of the non-linear equalizer.

48. The receiver device of claim 42, wherein the training sequence comprises period pilot signals with known pilot signal characteristics.

* * * * *